United States Patent [19]
Camping

[11] Patent Number: 5,476,582
[45] Date of Patent: Dec. 19, 1995

[54] FILTER COVER ASSEMBLY FOR DIFFERENTIAL HOUSING MECHANISM

[76] Inventor: Paul C. Camping, 2341 W. Sherman St., Phoenix, Ariz. 85009

[21] Appl. No.: 92,953

[22] Filed: Jul. 19, 1993

[51] Int. Cl.[6] ................................. B01D 35/06
[52] U.S. Cl. .................. 210/85; 210/95; 210/168; 210/222; 210/223; 210/336
[58] Field of Search .................. 210/95, 168, 222, 210/223, 336, 489, 335, 85; 74/467; 184/6.24, 6.25, 6.4

[56] References Cited

U.S. PATENT DOCUMENTS

| | | | |
|---|---|---|---|
| 1,937,943 | 12/1933 | Brown | 210/489 |
| 2,462,819 | 2/1949 | Trail | 210/168 |
| 3,279,607 | 10/1966 | Michaelson | 210/223 |
| 3,502,176 | 3/1970 | Terry | 210/168 |

FOREIGN PATENT DOCUMENTS

| | | | |
|---|---|---|---|
| 4003900 | 11/1991 | Germany | 210/168 |
| 148904 | 2/1955 | Sweden | 210/222 |

*Primary Examiner*—Matthew O. Savage
*Attorney, Agent, or Firm*—Tod R. Nissle

[57] ABSTRACT

A differential housing includes magnetic filters for removing metal particulate from oil circulating within the differential mechanism of a vehicle. The differential housing also permits the level and temperature of the oil to be monitored.

16 Claims, 2 Drawing Sheets

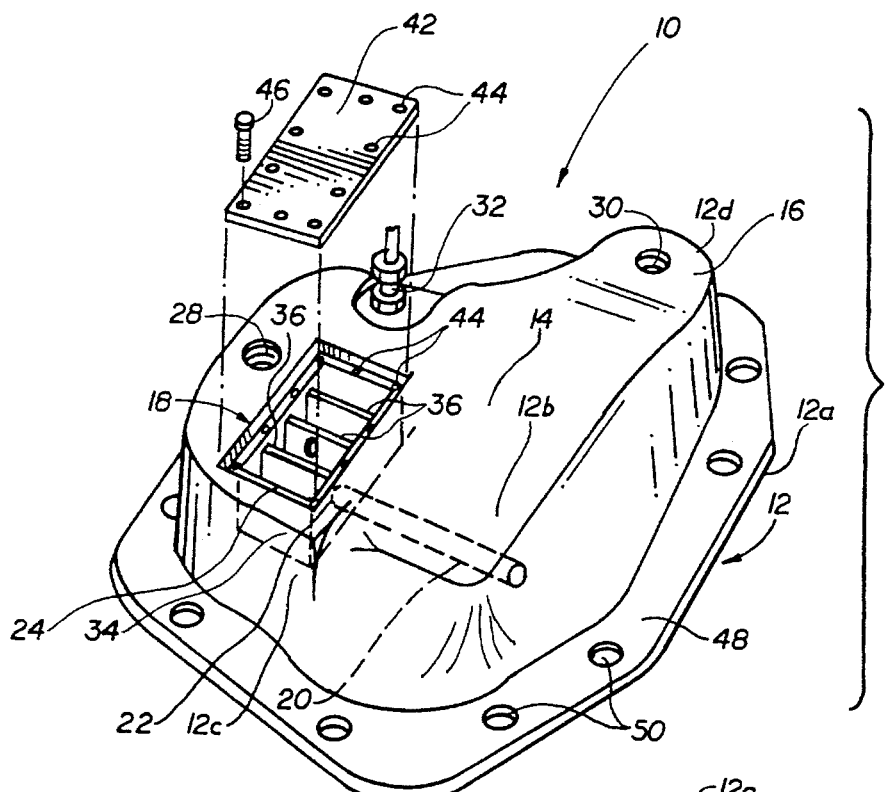
FIG. 1
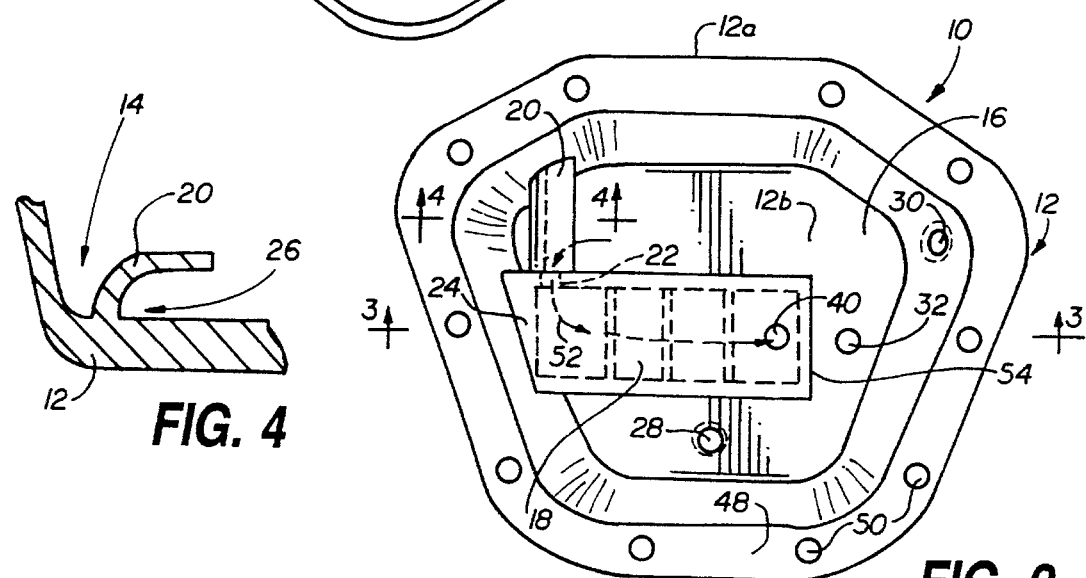
FIG. 2
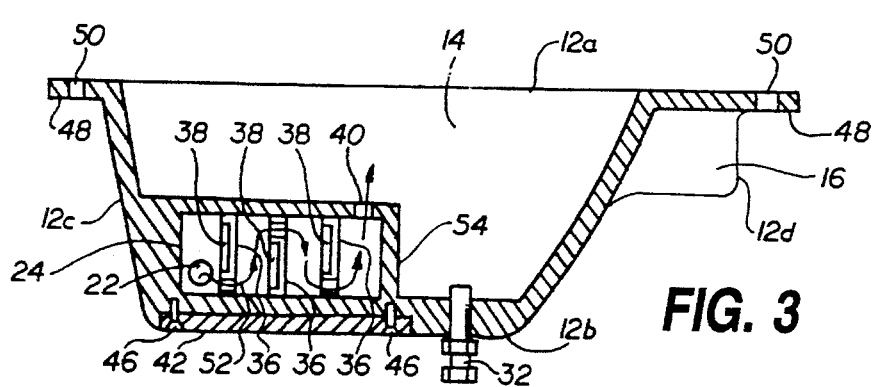
FIG. 4
FIG. 3

FILTER COVER ASSEMBLY FOR DIFFERENTIAL HOUSING MECHANISM

BACKGROUND OF THE INVENTION

The present invention relates generally to a cover member for a differential housing mechanism. More particularly, the present invention relates to a new and improved filter cover assembly for a differential housing mechanism which filters oil through separate levels of magnetic filters and increases oil capacity to enhance lubrication and cooling of the differential mechanism.

The differential gearing is an arrangement of gears forming a train which has one or more parts traveling around the circumference of another fixed part. This train connects two shafts or axles in the same line, thereby dividing the driving force equally between them, and permitting one shaft to revolve faster than the other. The main purpose of the driveshaft is to deliver the torque from the driveshaft and transfer it to both wheels.

The differential mechanism is not a sealed unit. Every differential has a vent tube at the top. In addition, moisture can enter the differential unit each time a vehicle is driven through water, snow, or mud. Water entering the differential breaks down the oil contained within the unit and, as a result, wears down the moving parts contained inside the differential. Metal from the wearing parts then circulates in the oil causing further pre-mature wearing. The oil in the differential mechanism may also become sulfated due to exposure to extreme prolonged heat. The resulting sulphated oil cannot lubricate properly.

Although preventative maintenance on the differential mechanism is badly needed, it is rarely performed. One of the reasons for this lack of preventative maintenance is the location of the differential mechanism. The differential mechanism is located at the rear of, and underneath, the vehicle. Furthermore, most rear covers for the differential mechanism do not contain drainplugs for draining the oil. Therefore, the entire cover for the differential mechanism must be removed in order to drain and change the oil. In addition, most automotive repair shops and lube shops will not remove the differential cover to change the oil due to the large number of vehicles that are returned with oil leaks as a result of this removal process.

Therefore, there is a need for a new and improved filter cover for a differential mechanism which can protect the differential from breakdowns due to inadequate lubrication and promote the servicing of the differential by facilitating the processes of checking the oil level and changing the oil in the differential mechanism.

SUMMARY OF THE INVENTION

Accordingly, it is a principle object of the present invention to provide an improved filter cover assembly for a differential mechanism which can protect the differential mechanism and facilitate the servicing of the differential mechanism.

It is a further object of the present invention to provide an improved filter cover assembly for a differential mechanism which utilizes separate levels of magnetic wafers to remove worn metal parts from the oil circulating within the differential mechanism.

It is a still further object of the present invention to provide a filter cover assembly for a differential mechanism which functions to extend the life of the differential mechanism and its moving parts.

It is yet a further object of the present invention to provide a filter cover assembly for a differential mechanism which enables an individual to monitor the oil level and temperature range contained within the differential mechanism.

It is still a further object of the present invention to provide a filter cover assembly for a differential mechanism which can be adapted to fit all types of vehicles.

In brief, there is provided a filter cover assembly for a differential mechanism which includes a cover member with an interior cavity having a filter housing and a lip member. The shape of the interior cavity forms an enlarged oil reservoir near its lower end which increases the oil capacity of the differential mechanism. The lip member is located near a top end of the filter cover assembly and functions to trap the oil which is picked up by the ring gear contained within a differential. The lip member also functions to redirect the oil to an opening in the filter housing. The filter housing contains separate magnetic wafers and filter members which are vertically stacked within the filter housing so that the oil is forced to alternately flow across a top surface of a magnetic wafer and then vertically through a filter member. In addition, the filter cover assembly also has a drain hole and drain plug to facilitate draining the oil from the differential mechanism, a fill hole and fill plug to facilitate filling the differential mechanism with the appropriate amount of oil, and a temperature sending unit which monitors the temperature of the differential mechanism.

These and other objects, features and advantages of the present invention will become more apparent to those skilled in the art from the following more detailed description of the preferred embodiment taken with reference to the accompanying drawings.

BRIEF DESCRIPTION OF THE DRAWINGS

FIG. 1 is a perspective view of a filter cover assembly for a differential mechanism in accordance with the present invention with the front cover of the filter assembly shown exploded and the filter housing and lip member shown in phantom.

FIG. 2 is a top elevational view of a filter cover assembly for a differential mechanism in accordance with the present invention.

FIG. 3 is a cross-sectional view taken along line 3—3 of FIG. 2.

FIG. 4 is a cross-sectional view taken along line 4—4 of FIG. 2.

DETAILED DESCRIPTION OF THE PREFERRED EMBODIMENT

Figure 5:
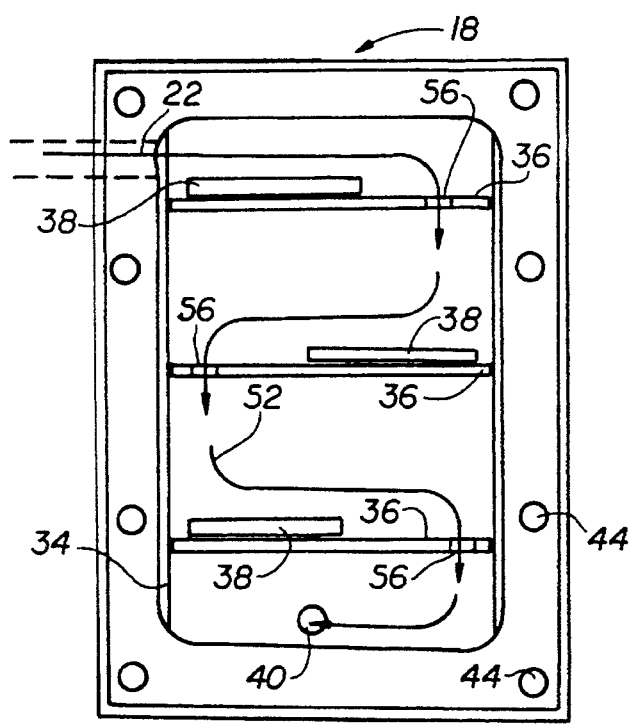
FIG. 5 is a front elevational view of a filter housing containing filter elements in accordance with the present invention.

Turning now to the preferred embodiment of the present invention with reference to FIG. 1, the differential mechanism filter cover assembly 10 consists primarily of a molded cover member 12 with an interior cavity 14 containing an oil reservoir 16, a filter assembly 18, and a lip member 20. The cover member includes an open rear end 12a for attachment to a differential housing, a front end 12b, a top end 12c, and a bottom end 12d. A predetermined amount of oil is maintained within the oil reservoir 16 in order to effectuate the operation of the filter assembly 18. When a vehicle moves forward, the oil in the oil reservoir 16 is picked up by the ring gear and carrier (not shown) of the differential mechanism and slung upward toward the lip member 20. The oil is then trapped under the lip member 20 and directed into the filter assembly 18 by an inlet 22 located under the lip member 20 which opens up into the top end 24 of the filter assembly 18.

The structure of the lip member 20 is more clearly shown in FIG. 4. FIG. 4 illustrates a cross section of the lip member 20 contained within the interior cavity 14 of the molded cover member 12. During forward movement of a vehicle, the oil picked up by the ring gear and carrier (not shown) is trapped in the area 26 under the lip member 20. The area 26 under the lip member 20 opens into the filter assembly 18 via an inlet 22. The oil is forced through the opening 22 and into the filter assembly 18 as a result of the torque from the ring gear and carrier (not shown) which pick up the oil and sling it into the area 26 under the lip member 20.

Returning now to FIG. 1, the molded cover member 12 also has three holes or openings passing through it which assist in carrying out various functions. A fill opening 28 is used to facilitate in filling the filter cover assembly 10 with oil or another lubricant to a predetermined level thereby providing an adequate amount of oil for lubrication and cooling. The fill opening is located at the recommended oil level and a fill plug (not shown) is used to seal the opening. A drain opening 30 is also provided in order to facilitate the removal of the old and contaminated oil from the molded cover member 12. The drain opening 30 is located near a bottom of the oil reservoir 16 and a drain plug (not shown) is used to seal the opening after the oil has drained from the molded cover member 12. Finally, an opening and a threaded plug 32 is provided for the optional installation of a temperature sending unit which can enable the driver to monitor the temperature of the differential mechanism (not shown).

As previously described with reference to FIGS. 1 and 4, the oil picked up by the ring gear and carrier (not shown) is trapped by the lip member 20 and directed through the inlet 22 into the filter assembly 18. The filter assembly 18 comprises a vertically positioned rectangular housing 34 having a series of vertically spaced perforated members 36 and wafer magnets 38 which can be seen more clearly in FIGS. 3, 5, and 7. The filter assembly further comprises an outlet 40 (See FIG. 2) located in a back side of the housing 34 near a bottom of the filter assembly 18. Filter assembly 18 can include screen members 65 and 66. After the oil has circulated through the series of vertically spaced members 36 and wafer magnets 38, the oil exits the filter assembly 18 through the outlet 40 in the housing 34 and returns to the oil reservoir 16 contained within the molded cover member 12. The housing 34 also comprises a transparent front cover 42 which forms a portion of the front end 12b of the cover member 12 and which may be removable and attachable by means of a series of holes 44 drilled around the perimeter of the transparent front cover 42 and the sides of the housing 34 such that the transparent front cover 42 can be secured to the housing 34 with screws 46. The front cover member 42 is transparent so that the condition of the oil and the level of the oil can be easily assessed. In addition, the transparent front cover 42 enables a determination of whether the metal shavings or particles collected on any of the wafer magnets 38 need to be cleared or removed so that the filter assembly 18 functions properly.

The cover member 12 also comprises a rim 48 having holes 50 drilled through the rim 48 so that the filter cover assembly 10 can be secured to the differential housing mechanism (not shown) by bolts or screws.

FIG. 2 shows a top elevational view of the filter cover assembly 10. The ring gear (not shown) of the differential mechanism (not shown) rotates through the oil contained within the oil reservoir 16 of the molded cover member 12 and throws the oil upward toward the lip member 20. The oil is trapped by the lip member 20 and the oil flow 52 is directed through the inlet 22 contained within the filter assembly 18 which is located near the top end 24 of the filter assembly 18. The oil flow 52 then proceeds through the members 36 and wafer magnets 38 contained within the filter assembly 18 and out through the outlet 40 located in the back side of the filter assembly 18 near the bottom end 54 of the filter assembly 18.

A more defined path of the oil flow 52 through the filter assembly 18 is illustrated in FIG. 3 which is a cross section taken along line 3—3 of FIG. 2. The oil flow 52 travels through the inlet 22 of the filter assembly 18, over the top of a wafer magnet 38, through a member 36, then alternates between flowing over additional wafer magnets 38 and through additional members 36 which are vertically stacked with respect to one another, and finally through the outlet 40 contained within the filter assembly 18.

As shown in FIG. 5, the members 36 and wafer magnets 38 are paired and then vertically interdisposed within the rectangular housing 34 of the filter assembly 18. The perforated members 36 may be screen members 36B extending from one side of the housing 34 to the other. Alternately, the perforated members 36 may be solid shelf members with openings 56 for the oil flow 52 located at opposite ends from those ends holding a wafer magnet 38. The wafer magnets 38 are alternately staggered toward opposite sides of the housing 34 so that the oil flow 52 will travel across each wafer magnet 38 contained within the filter assembly 18 before dropping down to the next filter level containing a wafer magnet 38 and member 36. As shown in FIG. 5, the wafer magnets on alternate perforated members are aligned along a common line perpendicular to said perforated members.

Figure 6:
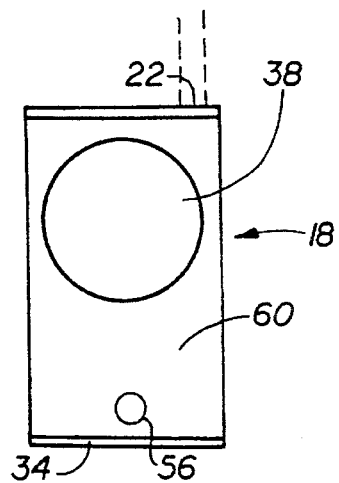
FIG. 6 is a top elevational view of filter elements contained within a filter housing in accordance with the present invention.
Figure 7:
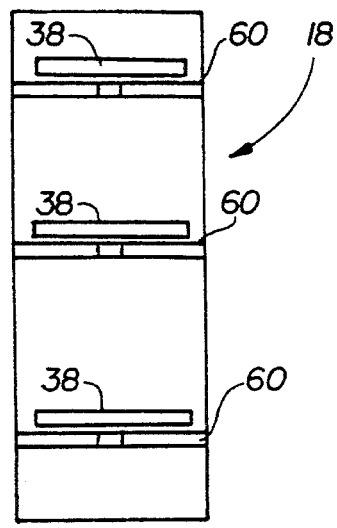
FIG. 7 is a side elevational view of filter elements contained within a filter housing in accordance with the present invention.

FIG. 6 illustrates a top elevational view of the filter assembly 18 showing the top filter level contained within the housing 34. The top filter level comprises a wafer magnet 38 which is placed on top of a solid shelf member 60. The oil flow travels through the inlet 22, across the wafer magnet 38, across the solid shelf member 60, and finally through the opening 56 passing through the solid shelf member 60 in order to gain access to the second filter level. The oil passing through the opening 56 falls directly on top of the wafer magnet which comprises a part of the second filter level. A side elevational view of the filter assembly 18 is shown in FIG. 7. Each filter level contained within the filter assembly 18 comprises a wafer magnet 38 and a solid shelf member 60 where each solid shelf member 60 contains an opening passing through it so that the oil can filter through to the next lower filter level.

Figure 8:
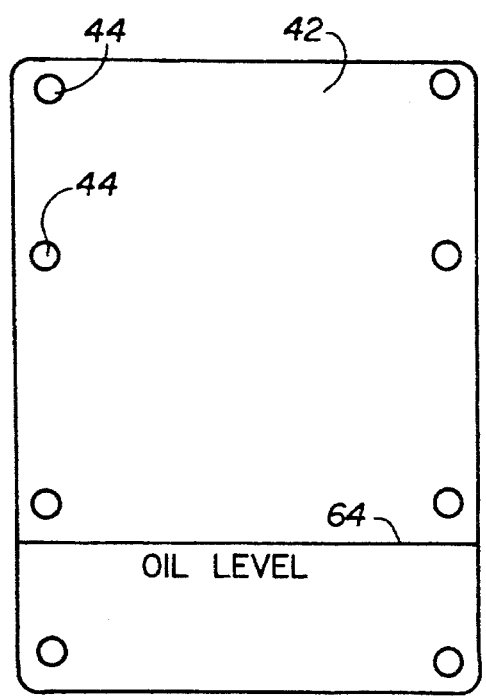
FIG. 8 is a front elevational view of a cover member of a filter housing in accordance with the present invention.

The transparent front cover 42 of the housing 34 which comprises the filter assembly 18 is shown in FIG. 8. An oil level marker 64 is indicated on the top of the front cover 42 so that the oil level contained within a differential housing can be easily determined and assessed without dismantling the differential.

The molded cover member 12 is preferably made of aluminum in order to deter the contamination of the oil and facilitate in the cooling of the oil. Furthermore, the filter assembly 18 preferably comprises at least three filter levels each of which includes a wafer magnet 38. Also, the oil reservoir 16 contained within the molded cover member 12 is preferably larger than any of the existing oil reservoirs for differential mechanisms.

The filter cover assembly 10 of the present invention was specifically designed to extend the life of the working parts inside the differential and to facilitate the servicing of the differential by providing 1) a tiered oil filtering system which uses magnets to remove metal particles, 2) an increased oil capacity, 3) a fill plug which is easily accessible, 4) a drain plug which is easily accessible, 5) a threaded hole temperature sending unit which enables a driver to monitor the temperature of the differential, and 6) aluminum construction which facilitates in cooling the oil.

While the preferred embodiments of the invention have been shown and described, it will be apparent to those skilled in the art that various changes and modifications may be made without departing from the true spirit and scope of the present invention. For that reason, the scope of the present invention is set forth in the following claims.

I claim:

1. A filter cover apparatus for a differential mechanism comprising:

(a) a cover member defining an interior cavity, said cover member having an open rear end for attachment to said differential mechanism, a front end, an upper end, and a lower end, said cavity defining an oil reservoir near said lower end;

(b) a lip member near said upper end such that a gear from a power transmitting gear unit of said differential mechanism is adjacent said lip member;

(c) a filter housing including a first end adjacent said upper end, a second end adjacent said lower end, an inlet near the first end, an outlet near the second end of the housing, and at least two perforated members interposed between the first and second ends of the housing, each said perforated member having a first side facing the first end of the filter housing; and (d) a wafer magnet located on the first side of each of said perforated members;

wherein said filter housing and lip member being positioned within said interior cavity and shaped and dimensioned such that said lip member opens into the inlet of and extends outwardly from the filter housing;

said perforated members being parallel panel shaped members and each of said wafer magnets being positioned such that said wafer magnets on adjacent perforated members are not aligned along a common line perpendicular to said perforated members.

2. The filter cover apparatus of claim 1 wherein said perforated members are screen members.

3. The filter cover apparatus of claim 2 wherein said filter housing further comprises a transparent cover forming a portion of the front end of said cover member and positioned adjacent said perforated members.

4. The filter cover apparatus of claim 3 wherein said cover member has a fill hole passing through the front end of said cover member and a fill plug for sealing the fill hole, said fill hole being adjacent said filter housing.

5. The filter cover apparatus of claim 4 wherein said cover member has a drain hole passing through the front end of said cover member and a drain plug for sealing the drain hole, said drain hole being positioned proximate said lower end.

6. The filter cover apparatus of claim 5 wherein said cover member further comprises a temperature sending unit extending through the front end of said cover member to allow a driver to monitor the temperature in the differential mechanism, said temperature sending unit being positioned between the filter housing and said lower end.

7. The filter cover apparatus of claim 1 wherein said perforated members each comprise a solid shelf having a first end, a second end, and an opening passing through said first end of said shelf; said wafer magnets being located on a said second end of said shelves.

8. The filter cover apparatus of claim 7 wherein said filter housing further comprises a transparent front cover forming a portion of said front end and secured to said filter housing adjacent said perforated members with fastening means which permit said front cover to be removed from the filter housing.

9. The filter cover apparatus of claim 8 wherein said cover member has a fill hole passing through the front end of said cover member and a fill plug for sealing the fill hole, said fill hole being adjacent said filter housing.

10. The filter cover apparatus of claim 9 wherein said cover member has a drain hole passing through the front end of said cover member and a drain plug for sealing the drain hole, said drain hole being proximate said lower end.

11. The filter cover apparatus of claim 10 wherein said cover member further comprises a temperature sending unit extending through the front end of said cover member to allow a driver to monitor the temperature in the differential mechanism, said temperature sending unit being positioned between the filter housing and said lower end.

12. The filter cover apparatus of claim 1 wherein said wafer magnets on alternate perforated members are aligned along a common line perpendicular to said perforated members.

13. A filter cover assembly for a differential housing mechanism comprising:

a cover member having an interior cavity, said cover member having an open rear end for attachment to the differential housing mechanism, a front end, an upper end, and a lower end, said cavity defining an oil reservoir near said lower end;

a lip member attached to said cover member near said upper end of said interior cavity; and, a filter housing mounted in said cavity and including a first end adjacent said upper end, a second end adjacent said lower end, at least two spaced apart wafer magnets interposed between the first and second ends of said filter housing, an inlet in the first end of said filter housing, an outlet in the second end of the filter housing and opening into said interior cavity of said cover member, first and second spaced apart solid shelf members which each carry one of the wafer magnets, and a transparent cover forming a portion of said front end and being attached to said filter housing and positioned adjacent said shelf members;

the first shelf member having an opening through which oil can flow toward the wafer magnet on the second shelf member;

the second shelf member having an opening through which oil can flow toward said outlet;

said filter housing and lip member being positioned within said interior cavity and shaped and dimensioned such that said lip member opens into the inlet of said filter housing to direct an oil flow through said inlet, over each of said magnet, and out said outlet into said interior cavity.

14. The filter cover apparatus of claim 13 wherein said cover member has a fill hole passing through the front end of said cover member and a fill plug for sealing the fill hole, said fill hole being adjacent said filter housing.

15. The filter cover apparatus of claim 14 wherein said cover member has a drain hole passing through the front end of said cover member and a drain plug for sealing the drain hole, said drain hole being proximate said lower end.

16. The filter cover apparatus of claim 15 wherein said cover member further comprises a temperature sending unit extending through the front end of said cover member to allow a driver to monitor the temperature in the differential mechanism, said temperature sending unit being positioned between the filter housing and said lower end.

* * * * *